United States Patent [19]
Law et al.

[11] 3,959,582
[45] May 25, 1976

[54] SOLID STATE ELECTRONICALLY ROTATABLE RASTER SCAN FOR TELEVISION CAMERAS

[75] Inventors: Robert L. Law; Paul S. Catano, both of San Diego, Calif.

[73] Assignee: The United States of America as represented by the Secretary of the Navy, Washington, D.C.

[22] Filed: Mar. 31, 1975

[21] Appl. No.: 563,907

[52] U.S. Cl. ............................ 178/6.8; 178/7.7; 178/7.8; 235/186; 235/189
[51] Int. Cl.² .................. G06G 7/22; H04N 7/18
[58] Field of Search .................. 178/6.8, 7.7, 7.8; 235/186, 189

[56] References Cited
UNITED STATES PATENTS

| | | |
|---|---|---|
| 3,603,726 | 9/1971 | Garber ............................ 178/6.8 |
| 3,634,622 | 1/1972 | Wheeler ........................... 178/7.8 |
| 3,641,260 | 2/1972 | Herndon .......................... 178/7.7 |

*Primary Examiner*—Howard W. Britton
*Attorney, Agent, or Firm*—R. S. Sciascia; G. J. Rubens; J. W. McLaren

[57] ABSTRACT

A electronic system develops a rotating raster scan in synchronism with a rotating image enabling a stationary image sensor to generate video signals for producing an erect, non-rotating image at a remote location. Sine and cosine signals are synchronously developed with the rotation of the image as a function of the instantaneous angle of the rotation. The sine and cosine signals are combined with linear vertical and horizontal sawtooth deflection signals and applied to the deflection means of the stationary image sensor to produce an erect, non-rotating video image on the face of a remote cathode ray tube display.

6 Claims, 5 Drawing Figures

SOLID STATE ELECTRONICALLY ROTATABLE RASTER SCAN FOR TELEVISION CAMERAS

BACKGROUND OF THE INVENTION

It is often necessary or desirable to transmit a visual image from a point where it originates to some remote location. Frequently electronic techniques, such as typified by closed circuit television, may be advantageously employed in the transmission of visual images to the desired remote location. Such remote presentation of visual information in the form of the desired image is quite conventional, simple, and straight-forward when the original image is erect and stationary. A stationary image may be sensed by an appropriate light sensitive imaging means, such as a vidicon tube, for example, for transmission to any desired point.

However, in some instances it is necessary or desirable that a scene be scanned and a full 360° panoramic view of visual information be transmitted to a remote point. In order to provide such a 360° panoramic view, a suitable optical means such as a rotating mirror tilted at a 45° angle may be employed to translate the 360° scene viewed from its original plane of view to the plane of a light-sensitive means such as a vidicon tube, for instance.

If the image sensing means, such as a vidicon tube, is rotated in synchronism with the rotating mirror, an erect panoramicly panned image, rotating through the full 360°, will be presented at the remote imaging means such as a conventional cathode ray tube of the television type. It is however, difficult and inconvenient to rotate the optical imaging means such as a vidicon tube because of the great number of electrical connections and controls associated with such an image sensor.

There are various optical mechanical and/or electromechanical arrangements for providing the maintenance of an erect image at the remote point; these include counter rotating optical wedges, K mirrors, dove prisms, and rotating deflection yokes, in addition to the aforementioned rotation of the image sensor such as a vidicon tube in synchronism with the rotating mirror.

Some of these techniques may be employed best at the image sensor where the rotating image originates, while other techniques are employed at the remote image display or the monitor. For example, it is possible to optically derotate the image just before the focal plane of the image sensor using one of the optical-mechanical techniques previously mentioned such as counter-rotating optical wedges, K mirrors, dove prisms, or rotating deflection yokes. These techniques and expedients may be quite acceptable if there is sufficient space available for the additional optical elements and the necessary servo-mechanism components which are required to be employed in their practice. There is, however, a loss of light transmission in the practice of most of these techniques which, of itself, is quite undesirable.

It is also possible to rotate the deflection assembly of the image sensor such as a vidicon tube by electro-mechanical means in synchronism with the rotating mirror or prism which is employed to sense a panoramic 360° visual scene, for example. However, the use of such techniques may entail even greater problems due to large size, complexity, and the required use of slip rings.

A third but even less efficient technique and means would be to rotate the entire image sensor such as a vidicon tube with the rotating mirror or prism. Although this is a form of simple derotating in theory, its practical implementation would require a substantial amount of power to drive the rotation of the image sensor if 360° rotation were necessary. In addition, slip rings, which introduce unwanted spurious signals or noise, would have to be employed. Moreover, in its practical embodiment and application this technique is bulky in size and cumbersome in that it introduces many undesirable peripheral problems and effects.

On the other hand, it is possible to rotate the deflection assembly by an electromechanical arrangement at the remote visual display such as provided by a remotely placed conventional television tube, for example, to maintain an erect, non-rotating image. Another possibility is the employment of an x,y coordinate rotation performed on the deflection fields produced by the deflection assembly of the remotely positioned cathode ray monitor or display. However, neither of these techniques or expedients is desirable from a human factors standpoint because in the use of either of these latter two methods and techniques the raster pattern of the remote television display tube would rotate to maintain the presentation of an erect non-rotating image.

Accordingly, in a system which has scan generated alphanumeric readout superimposed over the video presentation, the alpha-numeric characters would rotate along with the display raster so that if the raster had to rotate through 360° to maintain an erect non-rotating image of a 360° panoramic scene, the alpha-numeric characters would be rotating through the 360°, rendering them virtually unreadable for most of the rotation and distracting from the information contained in the video display presented in erect, non-rotating form.

This would be of particular concern from the human factors standpoint in that it would be most distracting and disconcerting to an observer in the man-machine interface context.

Consequently, there is a need for a technique and system for derotation of a rotating image which satisfies the requirements of space, cost, complexity, and human factors considerations as mentioned hereinbefore. Such a system should be desirably entirely electronic and electrical in its nature and not dependent upon electromechanical moving parts such as rotating deflection assemblies, etc. as were employed in prior art techniques and systems.

SUMMARY OF THE INVENTION

The present invention comprises an electromagnetic or electrostatic line scan derotation technique which is performed at the image sensor. The line scan pattern or raster as generated by the reading beam of a vidicon tube, for example, is rotated by means of the controlling field to compensate for the rotated image on the face plate of the sensor. The linear sawtooth deflection signals conventionally employed at the image sensor are modified to provide a coordinate rotation before being applied to the stationary deflection assembly of the image sensor.

The concept of the present invention requires that the raster pattern produced by the reading electron beam of an electronic image sensor, such as a vidicon tube, be rotated in synchronism with the rotating image received by the image sensor.

Such rotation for any point in the rotating image may be expressed in terms of x-y coordinates and the sine and cosine functions of the instantaneous angle of rotation relative to a reference angle, such as the stationary disposition of the image sensor stationary deflection means.

The present invention contemplates the generation of sine and cosine electrical signals as a function of the instantaneous angle of rotation of the rotating image. The conventional linear sawtooth vertical and horizontal deflection signals are then each multiplied by each of the sine and cosine signals.

The signal representative of the horizontal deflection signal multiplied by the cosine signal is summed with the signal product resulting from multiplication of the vertical deflection signal by the sine signal.

The signal representative of the horizontal deflection signal multiplied by the sine signal is subtracted from the signal product resulting from multiplication of the vertical deflection signal by the cosine signal.

The resultant sum signal is then applied to the vertical deflection means of the image sensor, and the resultant difference signal is applied to the horizontal deflection means of the image sensor causing rotation of the raster pattern of the electron beam sweep of the stationary image sensor and stationary deflection means, and consequent derotation of the rotating image received by the image sensor.

In other words, since the raster pattern of the image sensor is caused to rotate in synchronism with the rotating image viewed by the image sensor, its video signals transmit signals of an image which appears to be erect and non-rotating.

Accordingly, it is a primary object of the present invention to provide for the derotation of a rotating image by wholly electronic and electrical means.

An equally important object of the present invention is to provide for the derotation of a rotating image at the image sensor.

Another important object of the present invention is to provide derotated video signals of a rotating image that may be employed to generate an erect, non-rotating image at a remote visual display.

A further object of the present invention is to provide derotated video signals for generating an erect, non-rotating image on the face of a cathode ray tube of either the magnetically or electrostatically deflected type.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
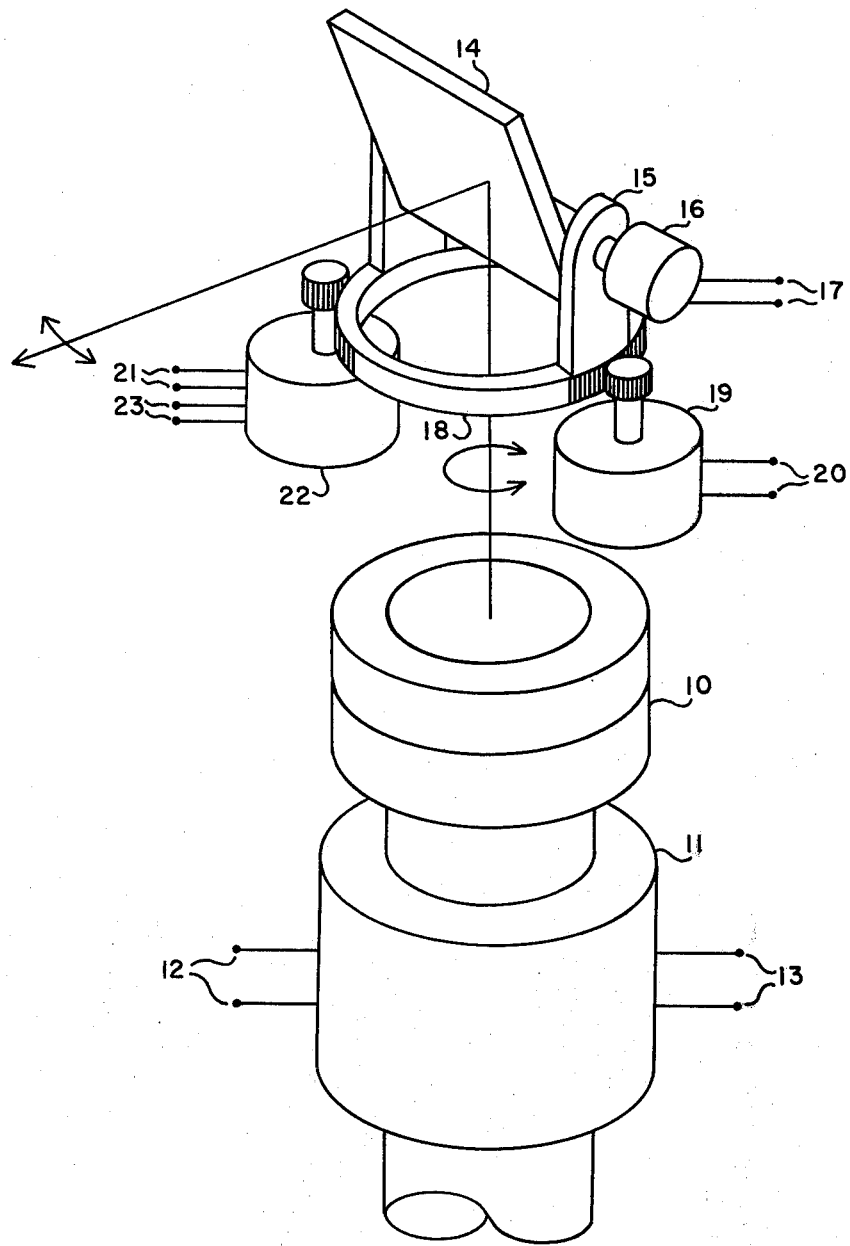
FIG. 1 is a perspective illustration of one type of imaging arrangement which may require image derotation.

FIG. 1 is a perspective illustration of a type of imaging system which may employ the image derotation system of the present invention to advantage. In FIG. 1 an optically sensitive imaging means such as a vidicon tube 10 is positioned with its face plate in a horizontal plane. A deflection yoke 11 includes connections 12 and 13 for causing the electron beam of vidicon tube 10 to scan in a predetermined raster format for detection of the instantaneous light energy contained in the image impinging upon its face plate.

The optical image is transmitted to the face plate of the vidicon tube 10 by a mirror 14 which translates the direction of the instantaneous image from its original spatial disposition, usually through a 90° angle by reason of a 45° tilt to the mirror 14. Thus, an image of a horizontal view will be translated through 90° by the tilt or disposition of the mirror 14 to the optically responsive vidicon tube 10. The mirror 14 is supported in a gimbaled means 15 and its angular disposition may be remotely controlled by means of an appropriate servomechanism motor 16 having electrical input connections 17.

It is frequently necessary or desirable to sweep the horizon, for example, to provide a panoramic 360° field of view. Accordingly, in the arrangement illustrated in FIG. 1 the gimbal assembly 15 is supported on a ring gear 18 which, in turn, is driven through appropriate mechanical linkage, such as gears, to the driving motor 19 under the control of electrical connections 20.

In order to obtain the desired panoramic 360° view, the mirror 14 is driven independently of the optically responsive image sensor 10. Accordingly, when the video signals generated by the vidicon tube 10 are transmitted to a remote location for reproduction of the scanned image, a rotating image will be reproduced and seen. It is necessary therefore to derotate the rotating image in order that an erect, stationary, non-rotating image of the 360° panoramic scene may be had as it is swept through each revolution by the rotated mirror 14.

In accordance with the concept and teachings of the present invention, sine and cosine signals are developed as a function of the instantaneous angle of rotation of the scanning mirror 14. Such sine and cosine signals may be generated by a number of means including dual cosine and sine potentiometers, for example, synchronously driven through mechanical connection to the ring gear 18 so that signals representative of the sine function of the instantaneous angle of rotation are developed at terminals 21 of the potentiometer 22, and signals representative of the cosine function of the instantaneous angle of rotation of the potentiometer 22 are developed at terminals 23. The sine and cosine signals thus developed in accordance with the concept of the present invention are employed in a manner which will be explained more fully hereinafter.

The present invention contemplates that the rotating image be effectively derotated for purposes of presenting an erect, non-rotating image at a remote location by causing the raster pattern of the optical sensor to rotate in synchronism with the rotating image, rather than remaining stationary relative to the rotating image which it views and senses on its face plate. In accordance with the concept of the present invention the deflection controls in vertical and horizontal directions are modified and operated upon so as to effectively cause the raster pattern to rotate in synchronism with the rotating image viewed by the optical sensor such as vidicon tube, for example.

Figure 2:
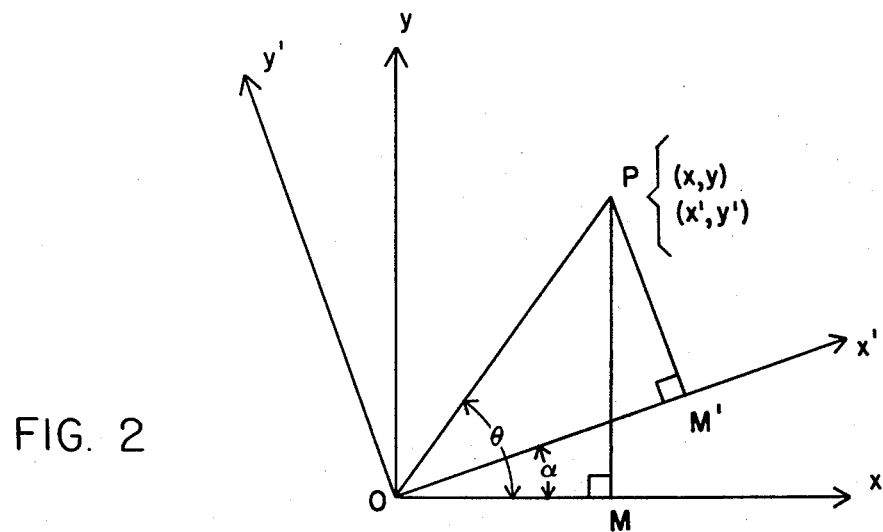
FIG. 2 is a graphical representation of the theoretical basis of relationships employed in the present invention.

Such rotation may be produced by coordinate transformation and FIG. 2 illustrates the relationships involved in the rotation of the raster pattern in a counter-clockwise direction for any point P on the image received and sensed by the stationary optical sensor. Referring to FIG. 2 it may be seen that the position of point P in terms of the original coordinates $x$ and $y$ are $$x = OM = OP \cos\theta \quad (1)$$

$$y = MP = OP \sin\theta \quad (2)$$

The new coordinates $x'y'$ resulting from the rotation of the raster pattern in the counter-clockwise direction are seen to be $$x' = OM' = OP \cos(\theta - \alpha) \quad (3)$$

$$y' = M'P = OP \sin(\theta - \alpha) \quad (4)$$

The summation of the two angles may be expressed as $$\cos(\theta - \alpha) = \cos\theta \cos\alpha + \sin\theta \sin\alpha \quad (5)$$

$$\sin(\theta - \alpha) = \sin\theta \cos\alpha - \cos\theta \sin\alpha \quad (6)$$

Applying these summations to equations 1 and 2 together with equation 3 and 4 produces the relationships:

$$x' = x \cos\alpha + \sin\alpha \quad (7)$$

$$y' = y \cos\alpha - x \sin\alpha \quad (8)$$

It may be seen that in order to provide a rotational compensation for the corrdinates in terms of $x'y'$, the original coordinates in $x$ $y$ in terms of the original raster disposition must be operated on by sine and cosine functions of the angle $\alpha$ as shown by equations 7 and 8. Thus, if it is assumed that in the electron beam deflection system of the vidicon tube 10, the horizontal sawtooth deflection signal $V_H = x$, and the vertical sawtooth deflection signal $V_v = y$, the $x'$ coordinate may be designated by a suitably modified horizontal deflection signal $V_{01}$ and the new coordinate $y'$ may be designated by a similarly suitably modified deflection signal $V_{02}$.

Upon substituting these designations into equations 7 and 8 the following relationships are produced:

$$V_{01} = V_H \cos\alpha + V_V \sin\alpha \quad (9)$$

$$V_{02} = V_V \cos\alpha - V_H \sin\alpha \quad (10)$$

Figure 3:
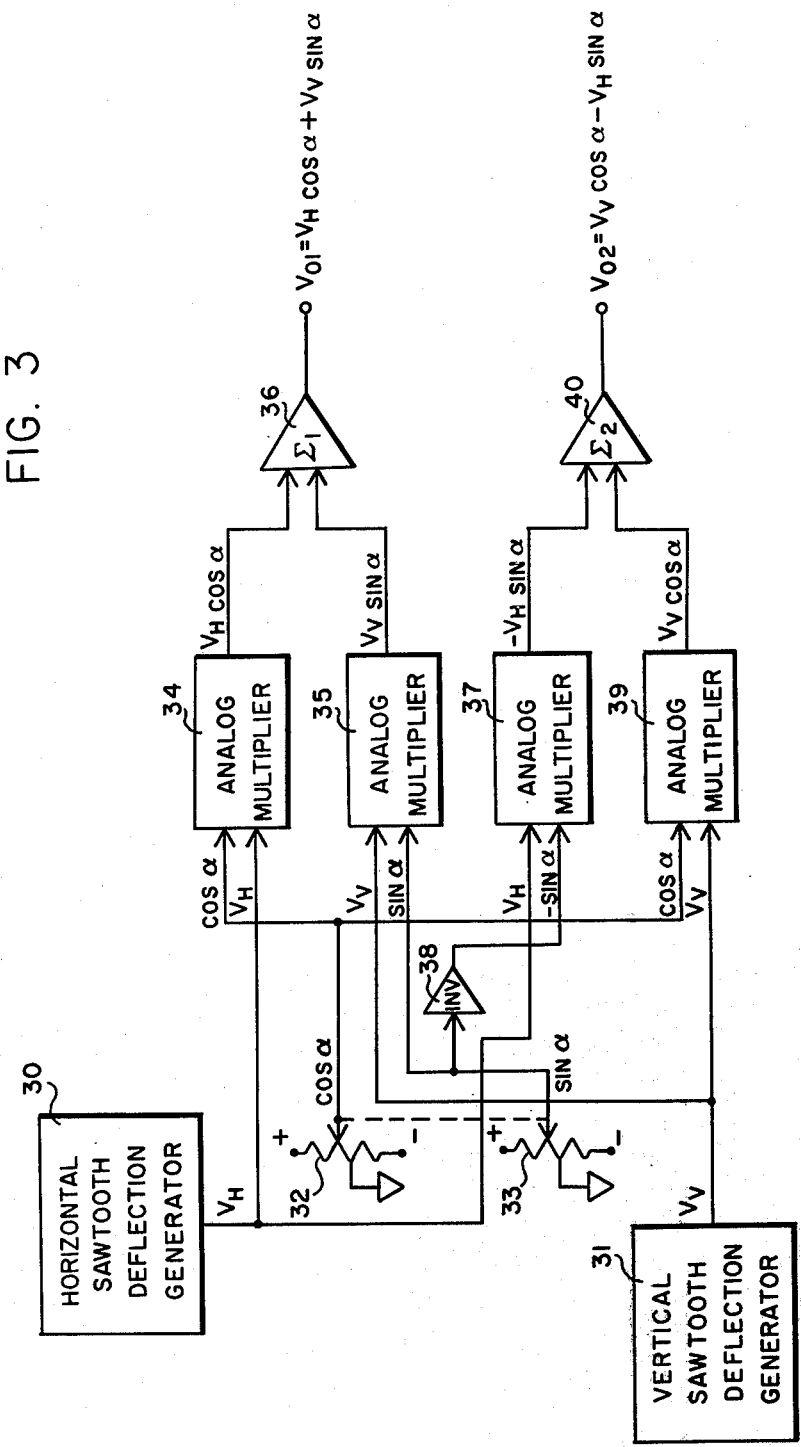
FIG. 3 is a schematic diagram of a portion of a system embodying the present invention.

FIG. 3 illustrates one embodiment of the present invention for synthesizing the operations of the foregoing equations and producing the required synchronous rotation of the raster scan of an optical sensor such as a vidicon tube, for instance.

The signal $V_H$ is derived from a horizontal sawtooth deflection generator 30. Similarly, a vertical sawtooth deflection signal $V_V$ is derived from a vertical sawtooth deflection generator 31. Each of these signals, $V_H$ and $V_V$, are operated upon by the sine and cosine signals developed by a suitable means such as the dual wiper sine/cosine potentiometer 22 pictorially represented in FIG. 1.

The windings of the potentiometer 22, FIG. 1, are schematically represented by a cosine winding 32 and a sine winding 33 in FIG. 3 with the respective wipers of the two windings 32 and 33 being mechanically driven in synchronism as indicated by the dash line linked between them. Thus, the winding 32 of FIG. 3 provides a signal as a function of the cosine of the instantaneous angle of rotation, $\alpha$, while the winding 33 provides a signal as a function of the sine of the instantaneous angle of rotation, $\alpha$.

The horizontal sawtooth deflection signals $V_H$ developed by generator 30 are combined in an analog multiplier 34 with the signals representing cosine $\alpha$ representative of the product of the horizontal sawtooth deflection signal $V_H$ multiplied by the cosine of $\alpha$.

The signals developed by the sine winding of the potentiometer 33 as representative of the sine function of the angle of rotation, $\alpha$, are combined in an analog multiplier 35 with the vertical sawtooth deflection signal $V_V$ developed by the generator 31. The output of the analog multiplier 35 is the product of the vertical sawtooth deflection signal $V_V$ multiplied by the signal representative of sine $\alpha$.

The signals developed by analog multipliers 34 and 35 are summed in a summing amplifier 36 to produce an output signal $V_{01}$ which is representative of the sum of the horizontal sawtooth deflection signal $V_H$ multiplied by the signal representative of the cosine of $\alpha$ added to the vertical sawtooth deflection signal $V_V$ multiplied by the signal representative of the sine of the angle of rotation $\alpha$, thus producing an electrical signal equivalent to the mathematically derived signal $V_{01}$ as shown by equation 9.

The horizontal sawtooth deflection signal $V_H$ developed by the generator 30 is combined in an analog multiplier 37 with the inverted version of the sine function signal developed from a sine winding in potentiometer 33 and an inverter 38, producing an output signal which is representative of $-V_H$ sine $\alpha$.

The cosine function signal as derived from the cosine winding 32 of the potentiometer is combined in an analog amplifier 39 with the vertical sawtooth deflection signal $V_V$ developed by generator 31 to provide an output representative of the product $V_V$ cosine $\alpha$. The output signals of analog multipliers 37 and 39 are summed in a summing amplifier 40 to produce an output $V_{02}$ which is representative of the mathematical expression $V_V$ cosine $\alpha - V_H$ sine $\alpha$ as mathematically illustrated by equation 10.

Figure 4:
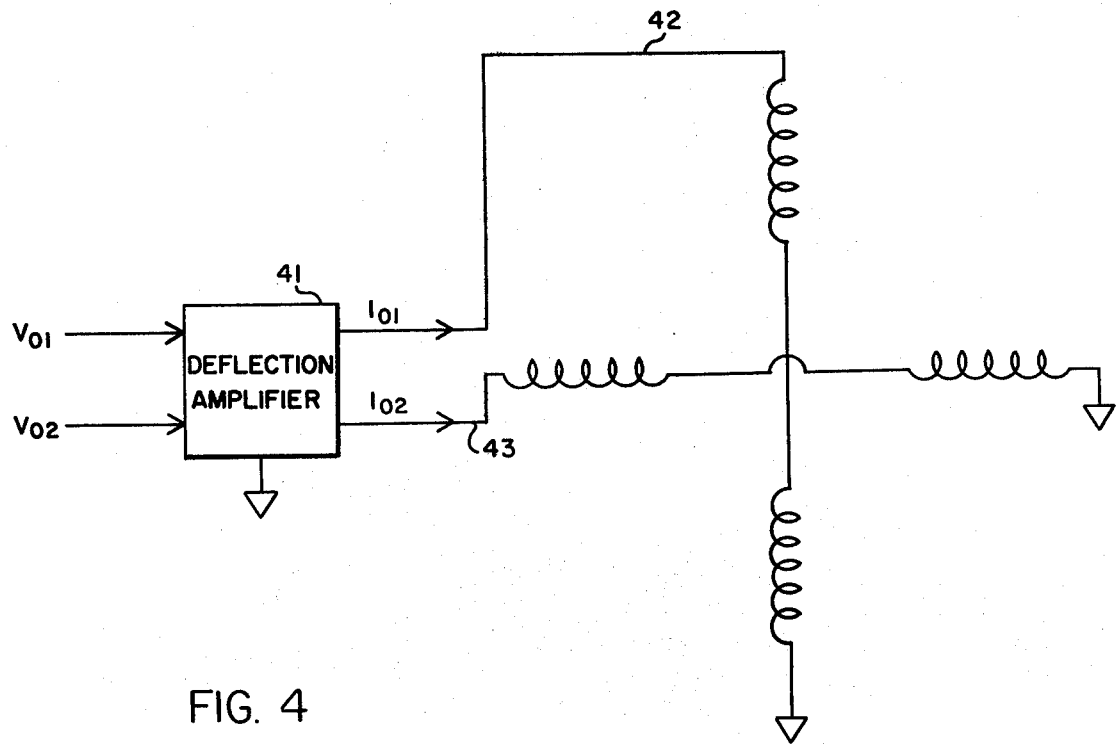
FIG. 4 is a schematic diagram of the deflection system of an image sensor used in the present invention.

The signals $V_{01}$ and $V_{02}$ are applied to an appropriate deflection amplifier 41 as shown in FIG. 4 to produce suitable drive signals which are applied through the vertical and horizontal deflection means 42 and 43, respectively, of the deflection yoke assembly of an optical sensor (such as the vidicon tube 10 illustrated in FIG. 1) for rotating the raster pattern in synchronism with the rotation of a mirror scanning through a panoramic 360° view. The resultant video signals will produce an erect, derotated image of the panoramicly viewed scene at a remote visual presentation such as may be achieved through the use of a closed circuit television arrangement, for example.

Figure 5:
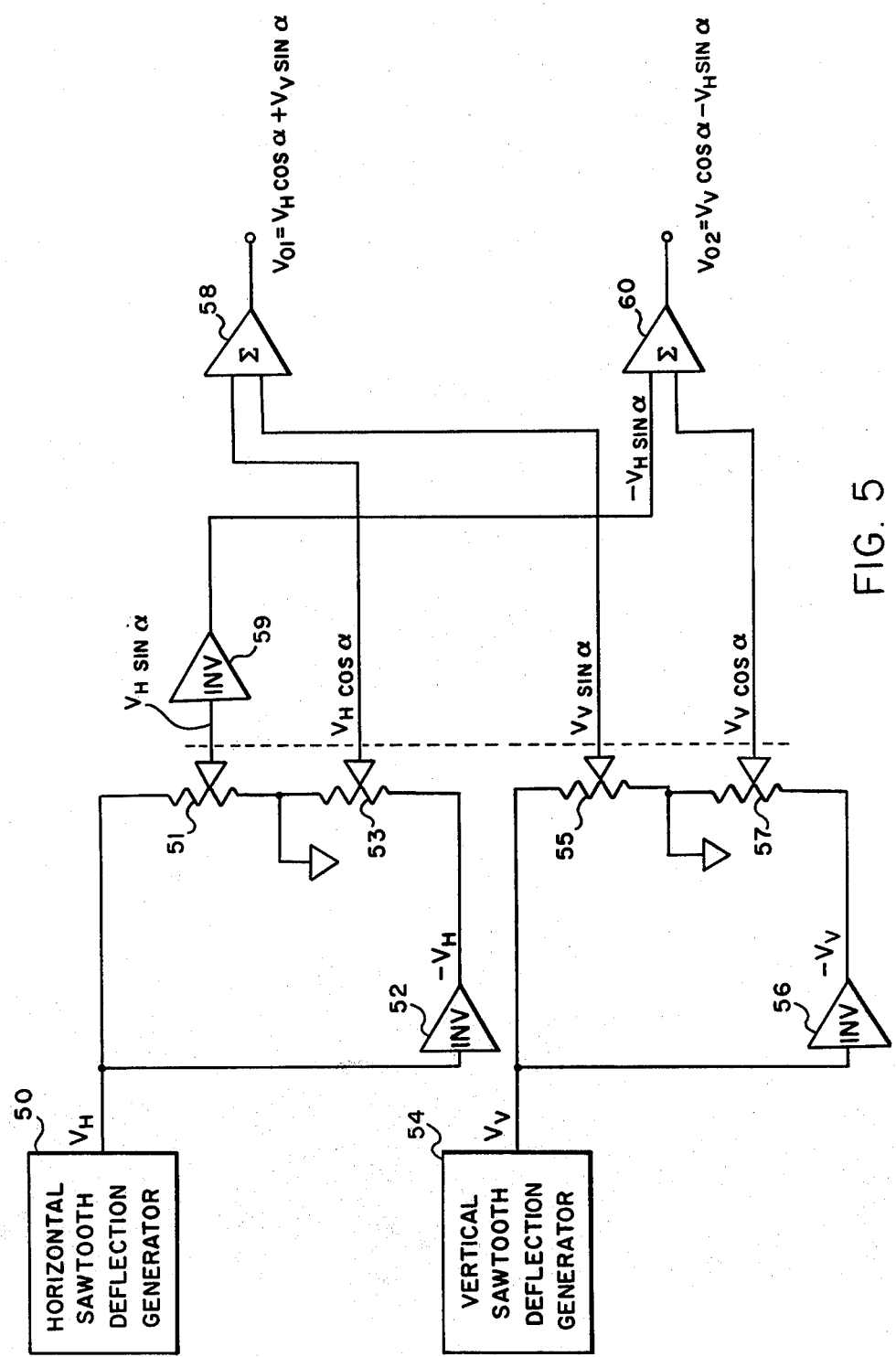
FIG. 5 is a schematic diagram of an alternative arrangement for developing sine and cosine signals as employed in accordance with the concept of the present invention.

FIG. 5 schematically represents an alternative arrangement for generating the desired signals to accomplish a rotating raster pattern that will effectively provide derotated video signals in accordance with the concept and teaching of the present invention. In FIG. 5 a horizontal sawtooth deflection generator 50 is connected as the input to a sine function potentiometer winding 51 and also through an inverter 52 to a cosine function potentiometer winding 53. The resultant signals developed at the respective wiper taps of the two windings 51 and 53 are $V_H$ sine $\alpha$ and $-V_H$ cosine $\alpha$ as indicated in FIG. 5.

A vertical sawtooth deflection generator 54 provides the input to a sine function potentiometer winding 55 and also through an inverter 56 to a synchronously tapped cosine function winding 57. As indicated by the dash line connection, the taps of the four windings 51, 53, 55, and 57 are all synchronously operative to provide their respective outputs as a function of the instantaneous angle of rotation $\alpha$.

The signal $V_H$ cosine $\alpha$ developed by the winding 53 is combined in a summing amplifier 58 with the signal $V_V$ sine $\alpha$ developed by winding 55 to produce the output $V_{01}$. The signal produced by winding 51 is connected through an inverter 59 as one of the inputs to a summing amplifier 60 where it is combined with the $V_V$ cosine $\alpha$ produced by the winding 57 to generate an output $V_{02}$, which is a function of the difference between the two signals received by the summing amplifier 60.

The signals $V_{01}$ and $V_{02}$ are applied to the vertical and horizontal deflection means to control the raster pattern of an optical sensor such as vidicon tube 10 shown in FIG. 1, in essentially the same manner as previously described in connection with the application of the signals derived from the system illustrated in FIG. 3.

Those skilled and knowledgeable in the pertinent arts will readily appreciate that the concept and teaching of the present invention provides a wholly electronic means to rotate the raster scan pattern of an optical sensor such as a vidicon tube or television camera synchronously with the rotating image or view so as to effectively produce video output signals which may be employed directly to provide an erect, non-rotating image at any desired remote location as, for example, through the use of closed circuit television techniques. The concept of the present invention is such that it eliminates the need for any moving parts with the exception, of course, of the wipers of potentiometers which are necessary to develop the desired sine and cosine function signals as a function of the instantaneous angle of rotation.

Moreover, the embodiments of the present invention are significantly less costly as compared to prior art and existing opto-mechanical and electro-mechanical arrangements for achieving the same type of result. Additionally, the present invention provides the desired derotation of a rotating image without generating radio frequency interference problems as were common in many of the motorized optical and electrical derotation systems of the prior art.

In the implementation of the present invention in preferred embodiments, conductive plastic sine/cosine function potentiometers may be used in place of solid state analog multipliers. This would eliminate any lack of stability which may be encountered in the use of analog multipliers as are included in the embodiment illustrated in FIG. 3.

In the embodiment illustrated in FIG. 5, which employs conductive plastic sine/cosine function potentiometers, the equations (9) and (10) are synthesized by applying the sawtooth deflection signal $V_H$ to both sides of one potentiometer. One side of the potentiometer is inverted so that the summation at ground is zero. The vertical sawtooth deflection signal $V_V$ is applied to the other potentiometer in the same manner. Though the two embodiments illustrated by the schematic diagrams of FIGS. 3 and 5 differ in detail, they are essentially both implementations of the identical concept of the present invention in synthesizing the signals representing the desired relationships expressed by equations (9) and (10).

Those skilled and knowledgeable in the pertinent arts will readily appreciate that though an electromagnetic deflection yoke assembly has been illustrated in FIG. 4, an electrostatically deflected optical sensor may be controlled in accordance with the concept and teaching of the present invention in essentially the same manner.

Obviously many modifications and variations of the present invention are possible in the light of the above teachings. It is therefore to be understood that within the scope of the appended claims the invention may be practiced otherwise than an specifically described.

What is claimed is:

1. A system for electronically derotating a rotating image comprising:

A stationary sensor repetitively scanning said rotating image in a predetermined raster format for developing video signals as a function of the instantaneous light intensity of said image, said sensor having vertical and horizontal deflection means for controlling said scanning;

means for generating substantially linear vertical and horizontal sawtooth deflection signals;

means synchronously operative with the rotation of said image for developing sine signals as a function of said rotation;

means synchronously operative with the rotation of said image for developing cosine signals as a function of said rotation;

means for developing signals representative of the products of said vertical and horizontal deflection signals each multiplied by each of said sine and cosine signals;

means for summing the signal representative of said horizontal deflection signal multiplied by said cosine signal with said vertical deflection signal multiplied by said sine signal;

means for subtracting the signal representative of said horizontal deflection signal multiplied by said sine signal from said vertical deflection signal multiplied by said cosine signal;

means for applying said sum and difference signals to said vertical and horizontal deflection means, respectively; and a cathode ray tube synchronously operative with the repetitive scanning of said sensor and connected to receive said video signals for visual presentation of said image in derotated form.

2. A system for electronically derotating a rotating image as claimed in claim 1 wherein said stationary sensor repetitively scanning said rotating image for developing video signals as a function of the instantaneous light intensity of said image comprises a vidicon tube.

3. A system for electronically derotating a rotating image as claimed in claim 1 wherein said cathode ray tube has electromagnetic deflection means.

4. A system for electronically derotating a rotating image as claimed in claim 1 wherein said cathode ray tube has electrostatic deflection means.

5. A system for electronically derotating a rotating image as claimed in claim 1 wherein said means synchronously operative with the rotation of said image for developing sine signals and cosine signals as a function of said rotation comprise potentiometers.

6. A system for electronically derotating a rotating image as claimed in claim 5 wherein said potentiometers comprise conductive plastic members.

* * * * *